(12) United States Patent
Soreau et al.

(10) Patent No.: US 6,879,542 B2
(45) Date of Patent: Apr. 12, 2005

(54) DEVICE FOR CONTROLLING NAVIGATION OF A TOWED SUBMARINE OBJECT

(75) Inventors: Didier Soreau, Plouzane (FR); Claude Lemoine, St. Pabu (FR); Jean-Philippe Goudeau, Le Rouret (FR); Philippe Kerdraon, Brest (FR)

(73) Assignee: THALES Underwater Systems S.A.S., Sophia Antipolis (FR)

( * ) Notice: Subject to any disclaimer, the term of this patent is extended or adjusted under 35 U.S.C. 154(b) by 288 days.

(21) Appl. No.: 10/240,271
(22) PCT Filed: Mar. 23, 2001
(86) PCT No.: PCT/FR01/00895

§ 371 (c)(1),
(2), (4) Date: Sep. 30, 2002

(87) PCT Pub. No.: WO01/75480

PCT Pub. Date: Oct. 11, 2001

(65) Prior Publication Data

US 2003/0039170 A1 Feb. 27, 2003

(30) Foreign Application Priority Data

Mar. 31, 2000 (FR) .......................................... 00 04136

(51) Int. Cl.$^7$ ................................................ G01V 1/38
(52) U.S. Cl. .......................................... 367/17; 367/16
(58) Field of Search ..................................... 367/16, 17

(56) References Cited

U.S. PATENT DOCUMENTS

| | | | |
|---|---|---|---|
| 3,605,674 A | | 9/1971 | Weese |
| 4,033,278 A | * | 7/1977 | Waters ........................ 114/245 |
| 4,510,586 A | | 4/1985 | Grall et al. |
| 5,054,400 A | | 10/1991 | Pineau et al. |
| 5,140,909 A | | 8/1992 | Pineau et al. |
| 5,404,339 A | * | 4/1995 | Cole, Jr. ....................... 367/16 |
| 5,532,975 A | * | 7/1996 | Elholm ......................... 367/16 |
| 5,619,474 A | * | 4/1997 | Kuche .......................... 367/17 |
| 6,011,752 A | * | 1/2000 | Ambs et al. ................... 367/17 |
| 6,016,286 A | * | 1/2000 | Olivier et al. ................. 367/17 |
| 6,144,342 A | | 11/2000 | Bertheas et al. |

\* cited by examiner

*Primary Examiner*—Thomas H. Tarcza
*Assistant Examiner*—Scott A. Hughes
(74) *Attorney, Agent, or Firm*—Oblon, Spivak, McClelland, Maier & Neustadt, P.C.

(57) ABSTRACT

A device that allows control of the navigation of a towed underwater device, such as a linear acoustic antenna. The device is equipped with a pair of horizontal wings and a pair of vertical wings. These wings are kept horizontal and vertical by pendular movement of the device about the antenna on which the device is fixed. The action of the horizontal wings, which influence only immersion, and of the vertical wings, which influence only the lateral offset, are thus decoupled. The power consumption of the device is reduced, thus allowing the device to be powered by internal batteries and allowing the device to be mounted on existing antennas.

20 Claims, 4 Drawing Sheets

DEVICE FOR CONTROLLING NAVIGATION OF A TOWED SUBMARINE OBJECT

BACKGROUND OF THE INVENTION

1. Field of the Invention

The present invention relates to devices which allow control of the navigation of a towed underwater object, particularly of a towed linear acoustic antenna, more particularly to keep the latter at a constant immersion and at a constant distance from other towed linear antennas parallel to it so as to form an array in the form of a comb. These acoustic antennas are more particularly used in oil exploration.

2. Discussion of the Background

Devices of this nature are more particularly known from U.S. Pat. No. 2,744,870 filed by the applicant company on Feb. 13, 1996 under the Ser. No. 96/01741, published on Aug. 14, 1997 and granted on Mar. 6, 1998. That patent sets out in particular the operational requirements and the principle of operation of devices of this nature, which are commonly known as "birds" because of their shape and because of the presence of wings intended to generate a hydrodynamic force which acts on the cable to keep it in a determined configuration.

The birds described in that earlier patent comprise a pair of coplanar wings the inclination of which can be adjusted separately by means of two motors, thus allowing the bird to orientate itself about its axis and therefore to act on the hydrodynamic force due to the wings in direction and amplitude. The antenna or, more specifically, the segment of antenna to which the bird is fixed, can thus be made to move both in the vertical direction, as was known earlier to adjust the immersion, and in the horizontal direction to maintain the straightness of the antenna and its spacing with respect to the adjacent antennas.

However, there is no separation between the adjustment for immersion and the adjustment for lateral position. Thus, to cause the segment of antenna to move, whether only in immersion or only laterally, it is necessary to actuate both motors because the rotational positioning of the bird about the axis of the antenna is not naturally stable. The electrical power consumption under such conditions is too high for these birds to be able to be powered by a power source internal to the bird, for example batteries. Indeed, given the autonomy needed for acquiring seismic signals, the volume of batteries would be prohibitive. It is therefore necessary, as described in the abovementioned patent, to resort to the use of a transformer to transmit the power. It is therefore necessary to modify the structure of the antenna to include the transformer primary, the secondary being situated in the body of the bird, and this has the major disadvantage of preventing the use of existing antennas.

SUMMARY OF THE INVENTION

To alleviate these disadvantages, the invention proposes a device for controlling the navigation of a towed underwater object, particularly of a towed linear acoustic antenna, comprising a body equipped with means for fixing it removably to an antenna, at least a first pair of wings fixed horizontally on the body and first means for modifying the inclination of this first pair of wings so as to control the immersion of the device, mainly characterized in that it further comprises a second pair of wings fixed vertically to the body and second means for modifying the inclination of this second pair of wings so as to control the horizontal position of the device in a determined situation.

According to another feature, the device comprises means of attachment to a linear antenna which allow the device to rotate freely about the axis of the antenna, and this device has zero weight in seawater and the distribution of the masses fixes its center of volume of gravity below its center of volume so as to keep the first pair of wings horizontal and the second pair of wings vertical by pendular action; these wings being symmetric with respect to its axis of rotation which is coincident with the axis of the antenna.

According to another feature, the lower vertical wing comprises, at its free end, a weight and the upper vertical wing comprises, at its free end, a float; the shapes and sizes of the weight and of the float being practically identical and tailored to have an effect similar to that of wing end plates.

According to another feature, the body comprises an upper part above the antenna in which an adjustable buoyancy volume is arranged, and a lower part in which the members for controlling and for the inclinations of the wings are gathered.

According to another feature, the body is formed of a first hollow part situated above the antenna, of a second hollow part situated below this antenna, and of two elongate connecting pieces and of a width practically equal to the diameter of the tubes and connecting these respectively at the front and at the rear, and in the middle of which the means of attachment to the antenna are fixed.

According to another feature, the two vertical wings are fixed respectively to two axles passing respectively through the upper part and the lower part of the body and connected together by a connecting piece in the form of a semicircle which surrounds the antenna in such a way that the two wings are secured to one another in their movement and that said connecting piece does not strike the antenna when the wings turn.

According to another feature, [lacuna] further comprises a recovery module fixed to the body.

BRIEF DESCRIPTION OF THE DRAWINGS

Other particulars and advantages of the invention will become clearly apparent from the description which follows, given by way of nonlimiting example with reference to the appended figures which depict.

DETAILED DESCRIPTION OF THE PREFERRED EMBODIMENTS

Figure 1:
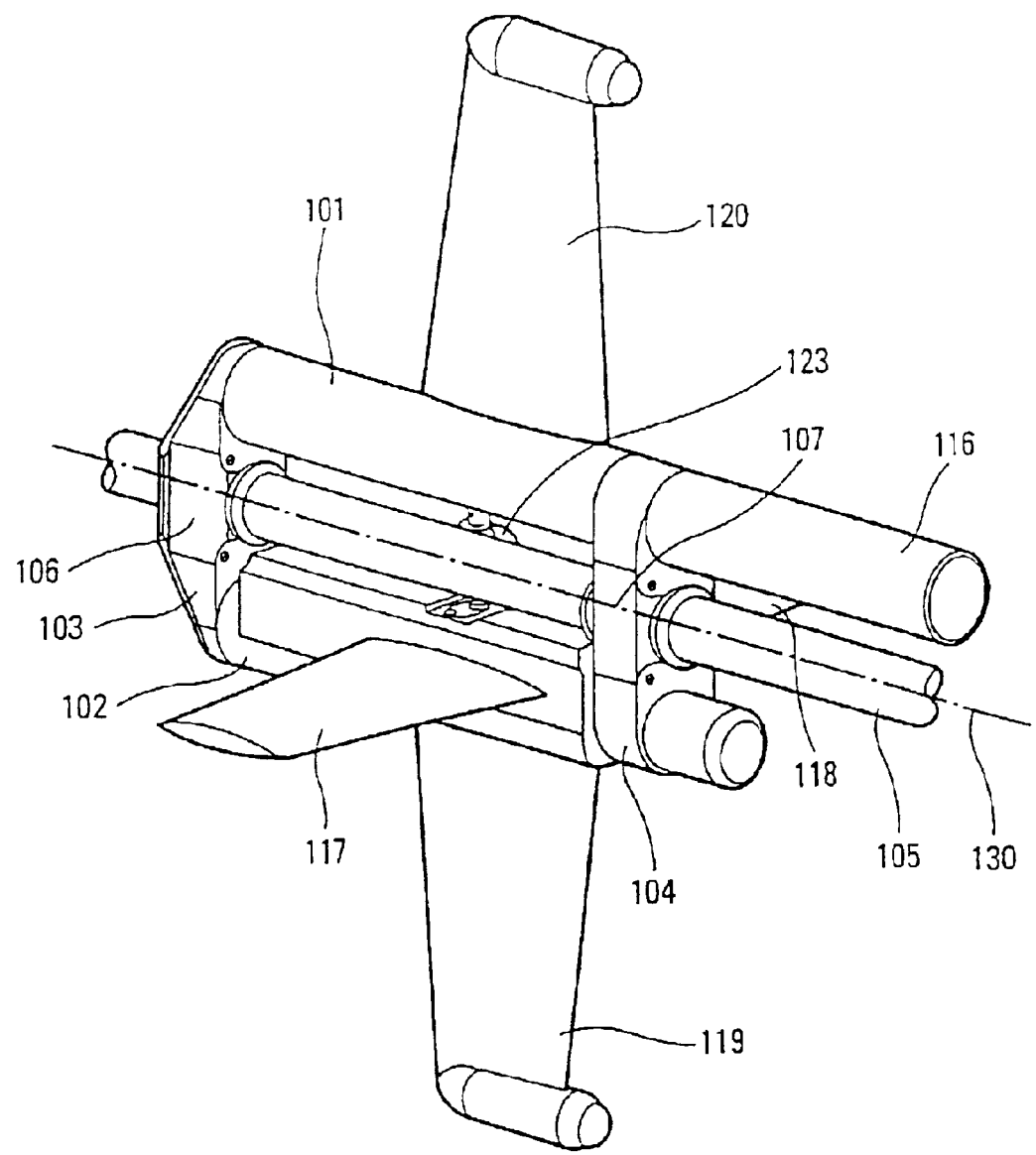
FIG. 1, a perspective view of a device according to the invention.
Figure 2:
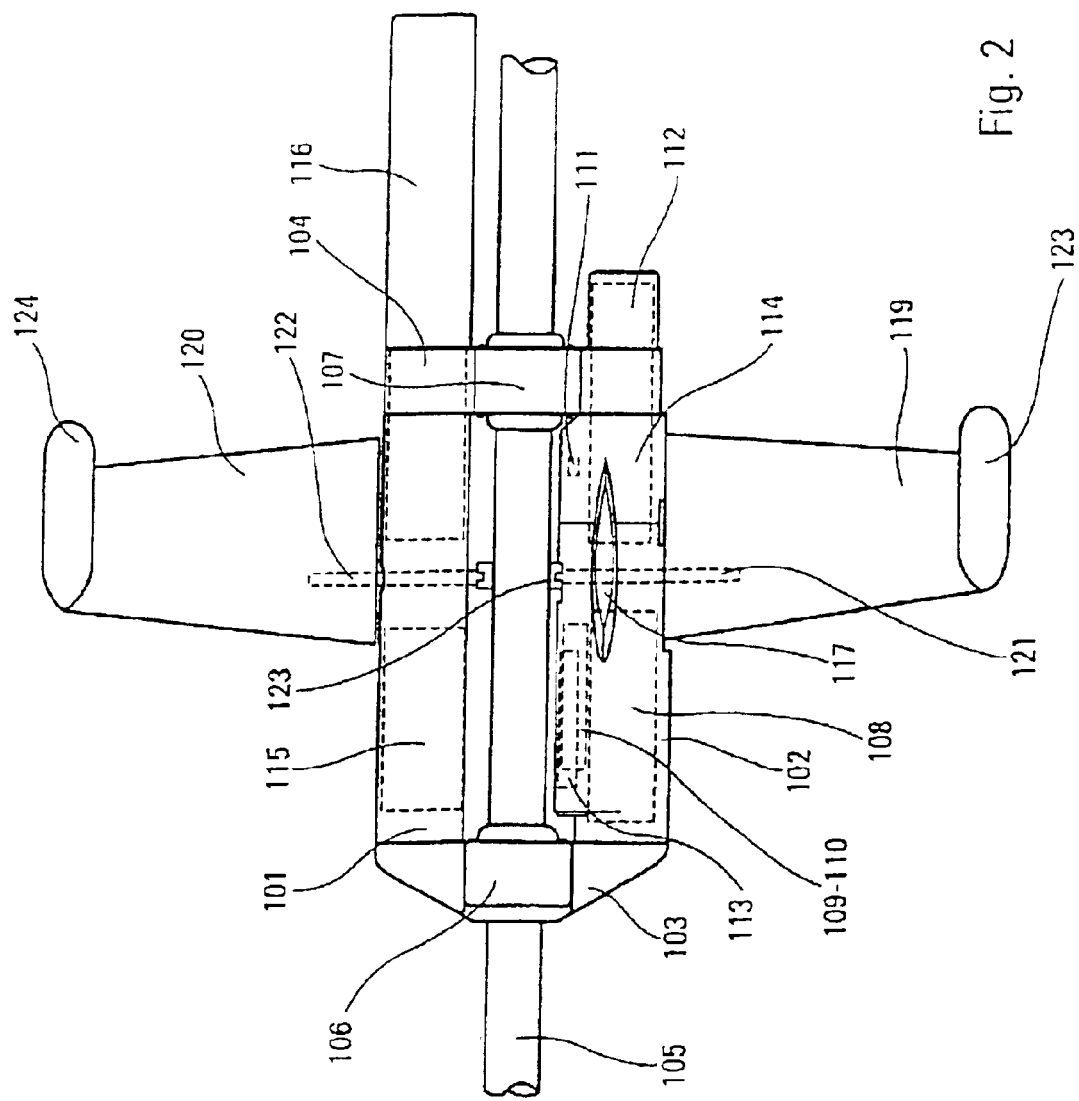
FIG. 2, a side and transparent view of this same device.
Figure 3:
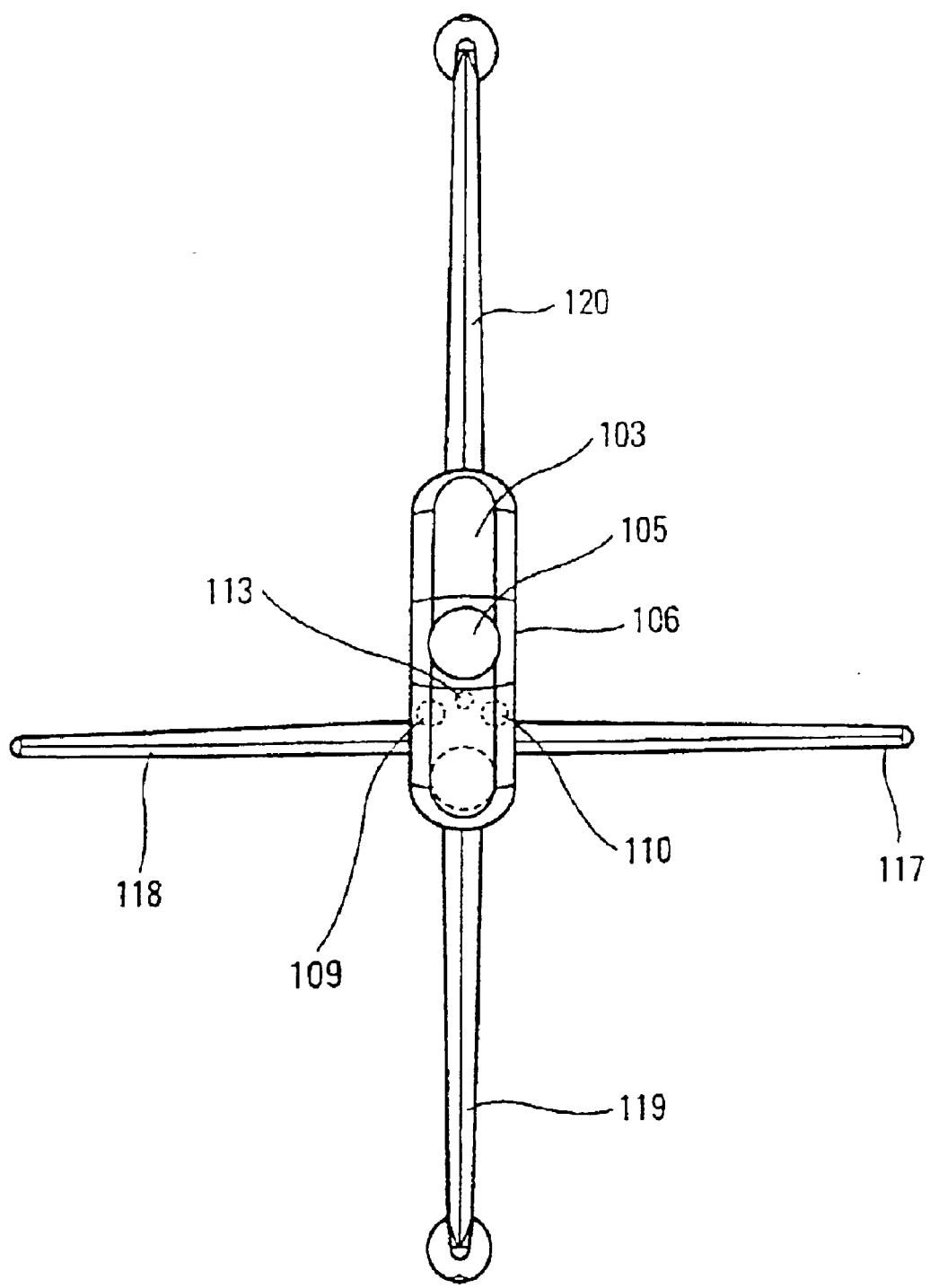
FIG. 3, a front and transparent view of this same device.

The bird according to the invention depicted in FIGS. 1 to 3 comprises a body essentially formed of an upper part of hollow tubular form 101 and of a lower part also of hollow tubular form 102.

These parts are connected by elongate connecting pieces 103 and 104 of a width practically equal to the diameter of the parts, so as to form therewith a frame of roughly rectangular shape. The front part of the connecting piece 103 is shaped in such a way as to obtain a good coefficient of drag in the water. The central part of these pieces 103 and 104 is recessed so that this body can be fixed to an acoustic linear antenna 105 which sits inside these recesses. Two attachment pieces 106 and 107 close these recesses to trap the antenna in the middle of the two connecting pieces 103 and 104, leaving a possibility of the body rotating about the antenna. These attachment pieces are fixed to the connecting pieces by a system of safety clips allowing both quick fitting and quick removal while at the same time providing a reliable attachment which cannot come off without operator intervention.

This device allows the birds to be fitted on and removed from the antenna in such a way that the latter can be stored on board the towing vessel, for example by winding it onto a winch. The birds are then stored separately.

The lower part 102 serves essentially in this embodiment to contain the various members intended to operate the bird. Thus it is possible to make out an electric power supply battery 108, formed, for example, of a collection of high-capacity cells, motors 109 and 110 for maneuvering the wings which are described later on, a pressure sensor 111, a heading sensor 112, a coil 113 for communication with the antenna, and a control unit 114, powered by the batteries 108 and allowing the motors 109/110 to operate from signals received by the coil 113, and information obtained from the sensors 111 and 112.

The upper part 101 for its part is essentially dedicated to keeping the bird as a whole with buoyancy which is practically zero in seawater. For that, the upper part 101 comprises a body 115 of adjustable density.

The rear of the part 101 is extended by a recovery module 116 which partially penetrates this part to be secured to it.

This recovery module, known from the state of the art, allows the bird and the part of the antenna to which it is attached to be raised to the surface of the sea if need be, for example following an accidental loss of control.

If appropriate, this recovery module may be replaced by a passive subassembly, which has the same shape, mass and weight in water as the recovery module, so as not to disturb the balance of the bird.

The bird comprises a first pair of horizontal wings 117/118 which are fixed to the lower part 102 practically at the middle thereof. The incidence of these wings is adjustable from the control unit 114 via one of the two motors 109/110. The variation in the incidence is the same for both wings because these wings are connected by a rigid fixing means which passes through the lower part 102, so as to obtain identical movement for both wings. Varying the incidence of these horizontal wings therefore allows their lift to be adjusted and allows the immersion of the bird in the sea to be controlled, in the known way.

The bird also comprises a second pair of vertical wings 119/120, one of which is fixed below the lower part 102 and the other of which is fixed above the upper part 101, practically at the middle of these two parts. These wings are fixed respectively to rotation axles 121 and 122 which pass vertically and respectively through the two parts 101 and 102. These rotation axles are connected by a connecting piece 123 of semicircular shape which surrounds the antenna 105. The diameter of this piece is large enough that during excursion of the pair of vertical wings, this piece does not strike the antenna 105. This assembly is driven in rotation by the other of the motors 109/110, from control signals delivered by the control unit 114, so as to obtain a lateral force which, via the bird, causes the antenna 105 to move in the horizontal plane so as to check its lateral offset in order on the one hand to keep this antenna as straight as possible and, on the other hand, to maintain the spacing between two antennas navigating together at a distance which is constant and equal to a determined value.

The bird is designed, according to the invention, to meet the following three conditions:
zero, or practically zero, weight in seawater (typical density $\rho = 1026$ kg/m$^3$),
center of gravity below the center of volume,
right/left and top/bottom symmetry of the torques due to the hydrodynamic forces about the axis of rotation of the bird corresponding to the axis of the antenna 130.

If M is the mass of the bird and V is its volume, then $M = \rho V$ is made to meet the first condition.

The free end of the lower vertical wing 119 is equipped with a shaped weight 123 and the upper vertical wing 120 with a shaped float 124 which play a part in meeting the second condition.

Finally, the symmetry between the vertical wings, including the weight and the float, and the horizontal wings, with respect to the axis of rotation of the bird, is achieved by construction so as to meet the third condition.

Thus, the bird constitutes a pendular system which is stable in the water, statically and dynamically, and therefore adopts a position of equilibrium such that the plane of its vertical wings remains roughly vertical and the plane of its horizontal wings remains roughly horizontal. In this way, the horizontal wings act only on the immersion of the bird, and therefore of the antenna, and the vertical wings act only on the lateral offset of the bird and of the antenna. Control of the immersion and lateral control of the geometry of the antenna to which the birds are fixed are thus decoupled.

Thus, in the steady state, the assembly is stable and there is no longer a need to constantly control the movement of the wings in order to ensure this stability, as was the case with the bird described in the applicant company's abovementioned patent application. Thus, when the incidence of the horizontal and vertical wings allows the desired geometry of the antenna to be obtained, there is then no longer any need to modify these incidences and therefore to power the corresponding motors in order to obtain these modifications. This supply of power will then be needed only when there is a desire to modify this geometry, for example to correct variations originating from underwater currents. Finally, the weight 123 and the float 124 exert a hydrodynamic action similar to that obtained with wing end plates, making it possible to obtain the same lift with a smaller inclination of the vertical wings.

Figure 4:
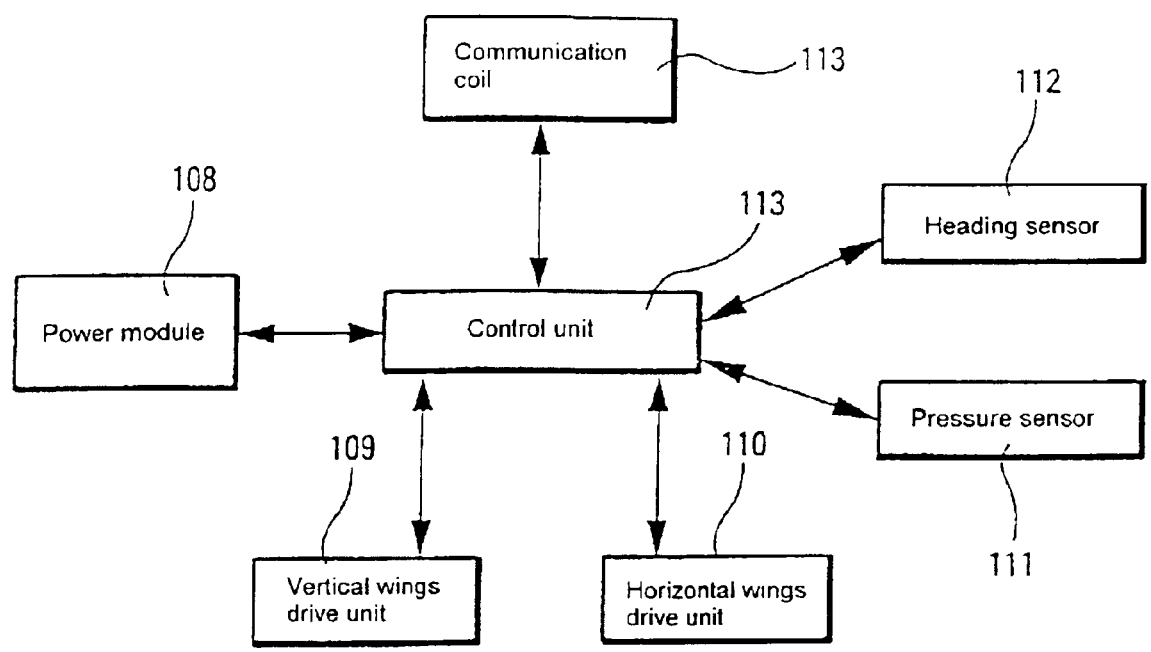
FIG. 4, a block diagram of the means of communication of this device.

The various subassemblies intended to control the wings, and which have been described above, are gathered together in the way set out in FIG. 4. The communication coil 113 is preferably formed of an induction coil, which comprises, for example, a ferrite bar placed longitudinally very close to the surface of the antenna 105. Another coil, not depicted in the figure, also comprising a ferrite bar, is situated in this antenna parallel to the coil 113 and as close as possible thereto, so as to ensure magnetic coupling between them. A conducting wire passing through the antenna and situated inside the latter connects the coil to the boat. Communication between the coils is two-way communication so that measurement and/or control signals from the bird can be sent to the towing boat, and vice versa.

In this way, the control unit can receive messages from the overall bird control system situated on board the towing ship and vice versa. These messages include, for example, set point information for the inclination of the planes of the wings. On the basis of the value of these set points, the control unit can make a comparison between the actual inclination of the plane of the wings and that which is to be obtained. It then formulates signals for controlling the motors 109/110.

The control of the movements of the wings may also be determined directly at the control unit on the basis of the measurements from the heading sensor 112 and pressure sensor 111, so as not to control these movements directly from the boat but to control them in situ allowing the immersion and the heading to be brought back to determined set point values.

As already stated earlier, the motors 109 and 110 operate intermittently to bring the planes of the wings to the desired incidences. When these are achieved their power supply is cut, making it possible to minimize the power consumption of the bird so that the internal power source formed by the battery 109 can be the only one used.

For that, each drive unit comprises, for example, a servomotor fitted with an encoder making it possible at every moment to know the angular position of the corresponding wings plane, and an irreversible transmission system allowing the shaft of the motor to be connected to the rotation axle of the plane of the wings, preventing hydrodynamic forces on these wings from modifying the value of their inclination when the power supply to the motor is cut.

What is claimed is:

1. A device for controlling navigation of a towed underwater object, comprising:
    body equipped with means for fixing the body removably to the object and to allow the device to rotate freely about an axis of the object;
    a first pair of wings fixed horizontally on the body;
    first means for modifying an inclination of the first pair of wings to control immersion of the device;
    a second pair of wings fixed vertically to the body; and
    second means for modifying an inclination of the second pair of wings to control a horizontal position of the device in a determined situation,
    wherein the device has zero weight in seawater and distribution of masses fixes a center of gravity of the device below its center of volume to keep the first pair of wings horizontal and the second pair of wings vertical by pendular action, the first and second pair of wings being symmetric with respect to their axis of rotation that is coincident with an axis of the object, and
    wherein the body is formed of a first hollow part situated above the object, of a second hollow part situated below the object, and of two elongate connecting pieces of a width substantially equal to a diameter of the hollow parts and connecting the hollow parts respectively at their front and rear, and in a middle of which the means for fixing the body removably to the object are fixed.

2. The device as claimed in claim 1, wherein the towed underwater object is a towed linear acoustic antenna.

3. The device as claimed in claim 1, wherein a lower wing of the second pair of wings comprises, at a free end, a weight, wherein an upper wing of the second pair of wings comprises, at a free end, a float, and wherein the weight and the float are substantially identical in shape and size and are configured to have an effect similar to that of wing end plates.

4. The device as claimed in claim 1, wherein the body comprises an upper part above the object in which an adjustable buoyancy volume is arranged, and a lower part in which members for controlling inclination of the first and second pair of wings are gathered.

5. The device as claimed in claim 1, wherein the second pair of wings are fixed respectively to two axles passing respectively through an upper part and a lower part of the body and connected together by a connecting piece in a form of a semicircle that surrounds the object such that the second pair of wings are secured to one another in their movement, and wherein said connecting piece does not strike the object when the second pair of wings turn.

6. The device as claimed in claim 1, further comprising a recovery module fixed to the body.

7. A device for controlling navigation of a towed underwater object, comprising:
    body equipped with means for fixing the body removably to the object and to allow the device to rotate freely about an axis of the object;
    a first pair of wings fixed horizontally on the body;
    first means for modifying an inclination of the first pair of wings to control immersion of the device;
    a second pair of wings fixed vertically to the body; and
    second means for modifying an inclination of the second pair of wings to control a horizontal position of the device in a determined situation,
    wherein the device has zero weight in seawater and distribution of masses fixes a center of gravity of the device below its center of volume to keep the first pair of wings horizontal and the second pair of wings vertical by pendular action, the first and second pair of wings being symmetric with respect to their axis of rotation that is coincident with an axis of the object, and
    wherein the second pair of wings are fixed respectively to two axles passing respectively through an upper part and a lower part of the body and connected together by a connecting piece in a form of a semicircle that surrounds the object such that the second pair of wings are secured to one another in their movement, and wherein said connecting piece does not strike the object when the second pair of wings turn.

8. The device as claimed in claim 7, wherein the towed underwater object is a towed linear acoustic antenna.

9. The device as claimed in claim 7, wherein a lower wing of the second pair of wings comprises, at a free end, a weight, wherein an upper wing of the second pair of wings comprises, at a free end, a float, and wherein the weight and the float are substantially identical in shape and size and are configured to have an effect similar to that of wing end plates.

10. The device as claimed in claim 7, wherein the body comprises an upper part above the object in which an adjustable buoyancy volume is arranged, and a lower part in which members for controlling inclination of the first and second pair of wings are gathered.

11. The device as claimed in claim 7, further comprising a recovery module fixed to the body.

12. A device for controlling navigation of a towed underwater object, comprising:
    a body configured to removably fix the body to the object and to allow the device to rotate freely about an axis of the object;
    a first pair of wings fixed to the body and configured to pivot about a first axis that does not extend through the axis of the object;
    a first motive device configured to pivot the first pair of wings about the first axis;
    a second pair of wings fixed to the body and configured to pivot about a second axis that extends through the axis of the object; and a second motive device configured to pivot the second pair of wings about the second axis, wherein a distribution of masses fixes a center of gravity of the device below its center of volume.

13. The device as claimed in claim 12, wherein the towed underwater object is a towed linear acoustic antenna.

14. The device as claimed in claim 12, wherein a lower wing of the second pair of wings comprises, at a free end, a weight, wherein an upper wing of the second pair of wings comprises, at a free end, a float, and wherein the weight and the float are substantially identical in shape and size and are configured to have an effect similar to that of wing end plates.

15. The device as claimed in claim 12, wherein the body comprises an upper part above the object and a lower part below the object, wherein the upper part houses an adjustable buoyancy volume, and wherein the lower part houses the first and second motive devices.

16. The device as claimed in claim 12, wherein the body is formed of a first hollow part situated above the object, a second hollow part situated below the object, and two elongate connecting pieces of a width substantially equal to a diameter of the hollow parts, wherein the two elongate connecting parts connect the hollow parts respectively at their front and rear, and wherein a middle of each of the two elongate connecting pieces is configured to removably fix the body to the object and to allow the device to rotate freely about the axis of the object.

17. The device as claimed in claim 12, wherein a first wing of the second pair of wings is fix to a first axle passing through an upper part of the body and a second wing of the second pair of wings is fix to a second axle passing through a lower part of the body, wherein the first axle and the second axle are connected together by a connecting piece in a form of a semicircle that surrounds the object such that the second pair of wings are secured to one another in their movement, and wherein said connecting piece does not strike the object when the second pair of wings turn.

18. The device as claimed in claim 12, further comprising a recovery module fixed to the body.

19. A device for controlling navigation of a towed underwater object, comprising:

a body including a first hollow part situated above the object, a second hollow part situated below the object, and two elongate connecting pieces, wherein the two elongate connecting parts connect the hollow parts respectively at their front and rear, and wherein a middle of each of the two elongate connecting pieces is configured to removably fix the body to the object and to allow the device to rotate freely about an axis of the object;

a first pair of wings fixed to the body and configured to pivot about a first axis;

a first motive device configured to pivot the first pair of wings about the first axis;

a second pair of wings fixed to the body and configured to pivot about a second axis; and a second motive device configured to pivot the second pair of wings about the second axis, wherein a distribution of masses fixes a center of gravity of the device below its center of volume.

20. A device for controlling navigation of a towed underwater object, comprising:

a body configured to removably fix the body to the object and to allow the device to rotate freely about an axis of the object;

a first pair of wings fixed to the body and configured to pivot about a first axis;

a first motive device configured to pivot the first pair of wings about the first axis;

a second pair of wings fixed to the body and configured to pivot about a second axis; and a second motive device configured to pivot the second pair of wings about the second axis, wherein a distribution of masses fixes a center of gravity of the device below its center of volume, and wherein a first wing of the second pair of wings is fix to a first axle passing through an upper part of the body and a second wing of the second pair of wings is fix to a second axle passing through a lower part of the body, wherein the first axle and the second axle are connected together by a connecting piece in a form of a semicircle that surrounds the object such that the second pair of wings are secured to one another in their movement, and wherein said connecting piece does not strike the object when the second pair of wings turn.

* * * * *